Aug. 5, 1924.
G. M. BACON
CALCULATING MACHINE
Filed May 18, 1922
1,503,742
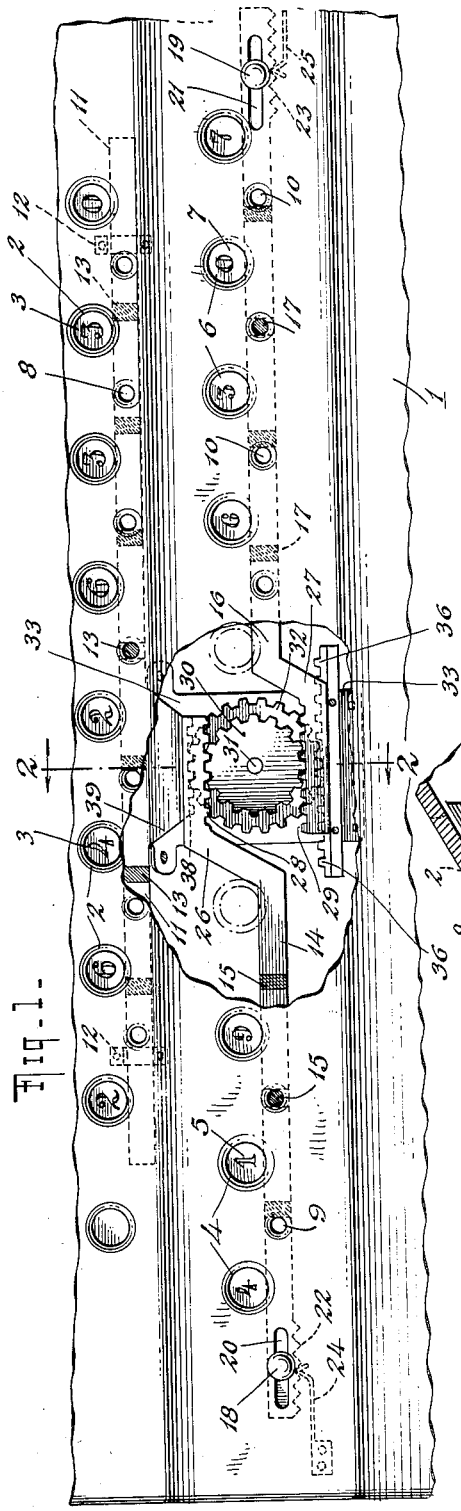
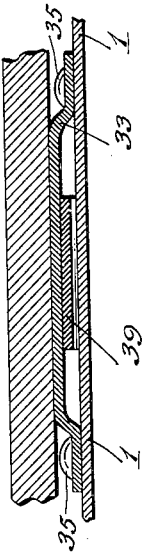
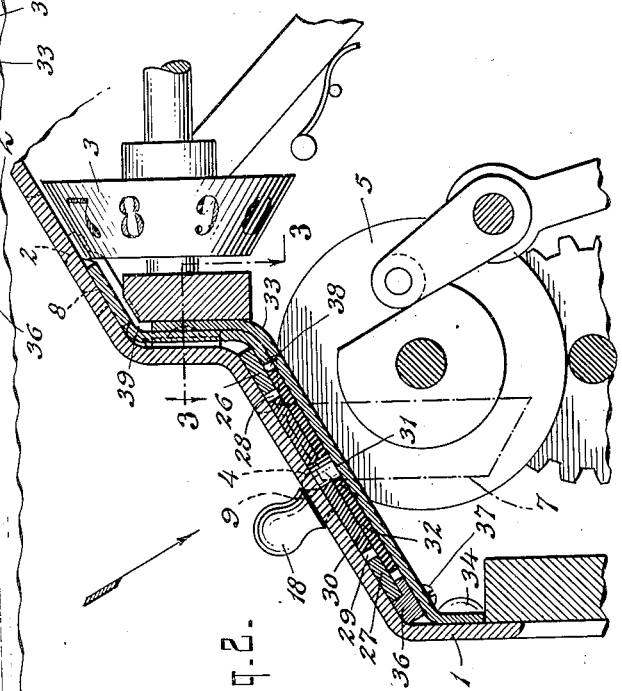
INVENTOR
George M. Bacon
BY
N. H. Lockwood
ATTORNEY Patented Aug. 5, 1924.

1,503,742

UNITED STATES PATENT OFFICE.

GEORGE M. BACON, OF SALT LAKE CITY, UTAH, ASSIGNOR TO BACON MULTIPLIER, INCORPORATED, OF SALT LAKE CITY, UTAH, A CORPORATION OF UTAH.

CALCULATING MACHINE.

Application filed May 18, 1922. Serial No. 561,819.

*To all whom it may concern:*

Be it known that I, GEORGE M. BACON, a citizen of the United States, and resident of Salt Lake City, county of Salt Lake, and State of Utah, have invented certain new and useful Improvements in Calculating Machines, of which the following is a specification.

My improvement relates more particularly to an automatic decimal point indicating or locating device for use in machines adapted more particularly for multiplication and division.

Heretofore, in machines of this character, the position of the decimal point of the product has usually been ascertained by mental calculation of the sum of the decimal point places in the multiplicand and multiplier, and if indicated at all, is indicated by pointers or the like. It will be obvious that errors may be made by the operator when depending on mental efforts, and with some complex calculations the proper location of the decimal point is apt to be confusing.

Therefore, the object of my improvement is to provide automatic means for determining the location of the decimal point and properly indicating the respective decimal points of the multiplicand, multiplier and product. In calculations of multiplication, the decimal point of the multiplicand and multiplier, respectively are usually given and the mental effort and confusion arises when it comes to properly locating the decimal point for the product. With my improvement, the operator merely moves the indicating devices for properly indicating the decimal points for the multiplicand and the multiplier, respectively and without any mental effort or computation on the part of the operator, the decimal point for the product is indicated in proper relation to the product.

My improved decimal point device may be adapted for various types of machines, but for the purpose of illustration, I have shown it in connection with my improved multiplying machine, substantially as shown and described in my pending application, Ser. No. 429,107, filed December 8, 1920. Therefore, in the accompanying drawings, the complete calculating machine is not shown, for reference may be had to the above application for the details thereof. The details, however, of the automatic decimal point device, and their relation to the rest of the machine and to the respective dials are clearly shown in the accompanying drawings, in which Fig. 1 represents a partial plan view of the front upper portion of my multiplying machine casing, partially broken away and looking in the direction of the arrow in Fig. 2 of the drawings; Fig. 2 is a sectional view on an enlarged scale, transversely of the decimal point mechanism, the section being taken on the line 2—2 of Fig. 1, and Fig. 3 is a detail horizontal sectional view on the line 3—3 of Fig. 2 to show the bracket supporting parts of the mechanism.

Referring to the drawings, 1 represents the casing or cover of my improved multiplying machine, substantially as shown in my pending application, above referred to, in which suitable sight openings 2 are formed for the series of product dials 3. The product dials 3 are located in the machine in position to show the numerals through the respective sight openings 2. The cover or casing 1 is also provided with a plurality of sight openings at 4, for visibly displaying the numerals of the multiplicand dials 5 located in the machine in position to register therewith. The casing or cover 1 is further provided with sight openings 6 for showing the numerals on the respective multiplier dials 7 located within the machine and adapted to register therewith. The relative positions of the product, multiplicand and multiplier dials are shown in Fig. 2 of the drawings, the multiplier dials 7 being indicated by dotted lines.

In addition to the sight openings 2, 4 and 6 just referred to, the cover casing 1 is provided with another row of small sight openings 8, located below and between the product dial sight openings, in position to indicate the decimal point, as it may be located when performing a calculation. Similar sight openings 9 are located below and between the sight openings for the multiplicand to indicate the decimal as it may be placed in relation to the multiplicand; and likewise the casing is provided with decimal point sight openings 10, located below and between the respective sight openings for the multiplier dials, substantially as shown in Fig. 1 of the drawings. Since it is not necessary to show or indicate a decimal point when the numbers are whole numbers, indicating devices or sight openings are not shown at the extreme right end of each series and since the accumulations on the product dials at the extreme left are by transfer from the next lower denomination, it is not necessary to provide a decimal point to the right of the last place.

For cooperation with the respective sight openings, 8, 9 and 10, and to indicate the positions of the decimal points, any suitable indicating devices may be employed, but preferably, in the form shown, I mount slide bars or strips back of the sight openings, and provide each strip with suitable contrasting markings to be brought into view at successive sight openings by sliding the strips on bars. The slide bars or strip for the product decimal points is indicated at 11 and may be held to slide adjacent the underside of the cover or casing by suitable brackets or cleats 12. The slide member 11 extends parallel with the sight openings, for showing the product and is arranged to cover the decimal point sight openings 8, located below the product sight openings 2, as indicated in Fig. 1 of the drawings. The outer surface of the casing or cover 1 is preferably colored black and it will be obvious that any contrasting color, such as white, placed on the strip or bar 11 under the sight openings 8 will be visible and if the arrangement is such that only one such mark is visible at a time, the decimal point may be properly indicated. Therefore, in the present device, the slide member 11 is provided with vernier markings or bands 13 of a color contrasting with the cover of the case and the remaining portions of the surface of the strip or slide 11 and between the markings, may be preferably colored black, so that nothing will be visible unless one of the bands 13 is in register with one of the decimal point sight openings 8. It will be seen that the bands or markings 13 are spaced apart as in a vernier, so that by movement of the strip 11, the markings are brought into view successively and only one band can be brought into register with its corresponding sight opening at a time.

Similarly a slide strip 14 is mounted to slide on the underface of the cover casing 1 below the multiplicand sight openings 4 and is located in position to cover the decimal point sight openings 9. The strip or slide 14 is likewise provided with vernier bands or markings 15 of contrasting color, the arrangement being such that only one band or marking 15 is adapted to be in register with its corresponding sight opening 9 at a time.

A similar slide strip 16 is mounted below the sight openings 6 of the multiplier dials and adapted to cover the decimal point sight openings 10. The strip 16 is also provided with markings or bands 17 of contrasting color and similarly spaced apart, as with the strips 11 and 14, so that only one band or contrasting marking may be visible at a time, through the corresponding decimal point sight opening 10.

Suitable clips (similar to clips 12) may be used for holding the slides 14 and 16 in position against the underface of the cover casing when desired, but preferably, this may be done in part by means of the operating knobs or handles 18 and 19, which are secured to the respective ends of the slides 14 and 16 and project through the casing 1, the latter being provided with slots at 20 and 21 of sufficient length to permit sliding or moving the respective strips 14 and 16 to bring the bands or contrasting marks 15 and 17 in succession into register with the respective decimal point sight openings 9 and 10.

The slide strips 14 and 16 are preferably provided with detent teeth or saw tooth racks at 22 and 23, cooperating respectively with fairly stiff detent springs 24 and 25, secured to the casing and provided with V-shaped noses, substantially as shown in Fig. 1 of the drawings. The detent teeth 22 and 23 are so located that they will hold the respective slides 14 and 16 against movement with one of the contrasting bands 15 and 17 in register with its corresponding decimal sight opening. As previously stated, it is not necessary to indicate the decimal points when the numbers are whole numbers, and, therefore, the slots 20 and 21 are long enough to permit movement of the respective slides 14 and 16 far enough toward the right, so that no contrasting band or mark will appear at any of the sight openings 9 or 10. The detent racks 22 and 23 are likewise provided with a sufficient number of teeth to permit this movement and to hold the slides in those positions.

In performing a multiplication, the decimal points for the multiplicand and multiplier are known and may be readily indicated with respect to the multiplicand and multiplier dials, or sight openings 4 and 6, by operating the respective knobs 18 and 19, thereby sliding the respective strips 14 and 16 until the contrasting bands 15 and 17 become visible through the respective decimal point sight openings 9 and 10, at the places where the decimal points are required. It remains, therefore, to describe the means for automatically indicating the position of the decimal point with relation to the product sight openings 2 and product dials 3 by moving the slide strip 11. This may be accomplished in various ways, by suitable mechanical connections between the respective strips 14, 16 and 11, but in the present instance, I have preferably made this connection by suitable racks and gears.

For this purpose, the sliding strips 14 and 16 are provided with off-set portions 26 and 27, provided with rack teeth 28 and 29, meshing respectively on opposite sides of a flat gear 30, rotatably mounted upon an axle or stud 31, located centrally of and preferably secured to a second gear 32, substantially as illustrated in Figs. 1 and 2 of the drawings. The two gears 30 and 32 are preferably held in position for bodily movement in the plane of the gears, at right angles to the axle thereof. For this purpose a bracket 33 is secured to the underface of the top place or casing 1 by suitable screws 34 and 35, as will be seen in Figs. 2 and 3 of the drawings, thereby providing means for not only supporting the gears for rotatable and slidable movement, but also for supporting the ends 26 and 27 of the sliding strips 14 and 16. The gear 32, at its lower edge, engages a rack 36, secured by screws or rivets 37 to the bracket 33, as will be seen in Figs. 1 and 2 of the drawings. The upper edge of the gear 32 engages a rack 38 located on the lower edge of a tongue-like projection 39, secured to or integral with the decimal point sliding strip 11 for the product dials. The tongue-like piece 39 is bent to conform with the shape of the casing 1, as indicated in Fig. 2 of the drawings, and reciprocates between the bracket 33 and the front of the casing, as more particularly shown in Fig. 3 of the drawings. The gears 30 and 32 are here shown of different diameters, but obviously, any suitable relative proportions may be employed so long as the spacing of the vernier markings are adjusted to correspond with the dimensions selected.

It will now be seen that any movement of the one or the other of the sliding strips 14 and 16 will cause rolling rotation of the gear 30 and through the displacement of the stud 31 will cause the gear 32 to roll on the rack 36, whereby the rack 38, connected by the tongue 39 with the slide 11, will cause the latter to move in the same direction and a corresponding amount.

From the foregoing description the operation should be readily understood in connection with the mechanical movements described, but it is desirable to give an illustration of the operation. It will be recalled that each of the slidable strips 11, 14 and 16 have their surfaces facing the underside of the casing and visible through the decimal point sight openings, colored substantially the color of the outer surface of the casing with the exception that, at intervals, they have contrastingly colored strips or bands 13, 15 and 17 located vernier-like, with respect to decimal point sight openings 8, 9 and 10, so that when the respective slides are properly moved, the contrasting bands will be exposed to view, one at a time, to thereby indicate the position of the decimal point respectively for the product, multiplicand and multiplier. If the sliding strips 14 and 16 are at their extreme right hand positions, that is, if the knobs 18 and 19 are at the extreme right ends of the slots, 20 and 21, it will be seen that none of the contrasting markings 15 and 17 will be exposed in the decimal point windows 9 and 10 for the respective multiplicand and multiplier series of dials. In this position, the gearing, including the racks 28, 29, 36 and 38 cooperating with the gears 30 and 32 will place the slide strip 11 of the product dials so that none of the contrasting markings 13 will be exposed through the decimal point sight openings 8 of the product. In this position the machine may be used for whole numbers, for in that case, it is not necessary to indicate the decimal points.

It will be seen, however, that if one of the slides associated with the multiplicand and multiplier dials is moved toward the left by means of the corresponding knob 18 or 19, while the other slide remains stationary, the gear 30 will roll on the stationary rack and by carrying the axle or stud 31 transversely, will roll the gear 32 on the rack 36 and correspondingly move the strip 11 an amount substantially equal to the movement of the strip moved by the knobs 18 or 19. Obviously, if both strips 14 and 16 are moved by their attached knobs 18 and 19, toward the left from their normal positions, the strip 11 will be moved an amount equivalent to the sum of the movements of the two strips 14 and 16. For example, if the strip 14 is moved one notch to the left, the first contrasting mark 15 will become visible through the decimal point sight opening between units and tens place; if it is moved two steps, as indicated in Fig. 1 of the drawings, the corresponding contrasting mark 15 will become visible in the decimal point sight opening 9 between the tens and hundreds places, and indicate the position of the decimal point. This is the position shown in the multiplicand series of dials in Fig. 1 of the drawings. If now the strip 16, cooperating with the multiplier dials, is moved to the left by means of the knob 19, the contrasting marks 17 will successively appear at the decimal point openings 10, and if this slide 16 is moved two notches, as indicated in Fig. 1 of the drawings, the contrasting mark will show in the decimal point sight opening between the tens and hundreds places, which is the position indicated in Fig. 1. It will be apparent that the slides 14 and 16 may be moved simultaneously by means of their respective knobs 18 and 19, when so desired. By means of the intermediate gears 30 and 32, as previously explained, the slide 11 below the product dials, will be simultaneously moved toward the left an amount equal to the sum of the movements of the multiplicand and multiplier slides 14 and 16, and, therefore, the corresponding contrasting marking 13 will become visible in the fourth decimal point sight opening or between the thousands and tens of thousands places of the product, as indicated in Fig. 1 of the drawings. It will be seen that no mental effort is required in computing the position of the decimal point for the product, for this is automatically determined by the mere mechanical act of moving the knobs 18 and 19 and pointing off or indicating the decimal points for the multiplicand and multiplier respectively, which points are known to the operator.

It will be understood that machines of this character are frequently utilized for performing division and my improved decimal point device may be used for properly indicating the decimal points when the machine is so used. For division, the dividend is set up on the product dials and the divisor upon the multiplicand dials. In both of these, the position of the dicimal points would be known. The operator would, therefore, move the slide 14 by means of the knob 18, to a position to properly indicate the decimal point of the divisor and then move the slide 16 by means of the knob 19 until the slide 11 has been moved to expose one of the markings 13 in the corresponding decimal point sight opening to properly indicate the position of the decimal point of the dividend. After this has been done, it will be apparent that the decimal point, shown in one of the decimal point sight openings 10, associated with the multiplier dials, will indicate the position of the decimal point for the result.

While I have shown one form of my device, as more particularly adapted for my improved multiplying machine, as shown and described in my pending application, hereinbefore referred to, it will be understood that my improvement may be adapted for use in connection with various other types of calculating machines, and, therefore, I do not wish to be limited to the specific arrangement and construction herein shown and described, for obviously, various modifications in the specific details may be made to satisfactorily accomplish the same results without departing from the spirit and scope of the invention.

I claim:—

1. In a calculating machine, the combination with multiplicand, multiplier, and product dials, of means for indicating the decimal point position of the multiplicand and multiplier respectively, and simultaneously indicating the decimal point of the product.

2. In a calculating machine, the combination with multiplicand, multiplier and product dials, of movable decimal point indicating devices associated with each series of dials respectively, and means interconnecting said devices, whereby the setting of the decimal point for the multiplicand and multiplier automatically sets the decimal point for the product.

3. In a calculating machine, the combination of a series of multiplicand dials, a series of multiplier dials, and a series of product dials, movable members associated with each series of dials for indicating the position of the decimal point, means interconnecting said members, whereby the pointing off of the decimal point for the series of multiplicand dials and for the series of multiplier dials, simultaneously and automatically indicates the position of the decimal point for the series of product dials.

4. In a calculating machine, the combination with a casing provided with sight openings, respectively, for a series of multiplicand dials, a series of multiplier dials and a series of product dials, said casing being also provided with other sight openings for indicating the position of the decimal point, respectively, of the multiplicand, multiplier and product dials, of indicating means cooperating with said decimal point sight openings for automatically indicating the position of the decimal point of the product in accordance with the decimal points set up and indicated for the multiplicand and multiplier.

5. In a calculating machine, the combination with multiplicand, multiplier and product dials, of a casing or cover provided with sight openings for the respective dials, means associated with said dials and sight openings, for locating and visually indicating the position of the decimal point for each series of dials, the arrangement being such that setting the decimal point for the multiplicand and multiplier dials automatically positions and indicates the decimal point for the product dials.

6. In a calculating machine, the combination with a plurality of multiplicand dials, a plurality of multiplier dials, and a plurality of product dials, slidable members associated with each series of said dials and movable to different position for indicating the decimal point for each series of dials, respectively, and interconnecting means between said slidable members whereby movement of the slidable members associated with the multiplicand and multiplier to indicate the respective decimal points thereof will simultaneously move the slidable member associated with the product dials to automatically indicate the position of the decimal point for the product dials in accordance with the position of the decimal points of the multiplicand and multiplier.

7. In a calculating machine of the character described, provided with a series of product dials, a series of multiplicand dials, and a series of multiplier dials, the combination of indicating means adapted to become visible between the respective dials of each series for indicating the position of the respective decimal points, means for operating the decimal point indicating means of the multiplicand and multiplier and means for automatically indicating the decimal point of the product dials as an incident to positioning and indicating the decimal points of the multiplicand and multiplier.

8. In a calculating machine the combination, of movable means for progressively displaying and indicating the decimal point for the multiplicand and multiplier, respectively and means cooperating therewith for automatically and progressively displaying and indicating the decimal point of the product according to the decimal point indications of the multiplicand and multiplier.

GEORGE M. BACON.